F. S. ELLETT & C. E. FORSYTH.
CLUTCH AND BRAKE MECHANISM.
APPLICATION FILED JUNE 27, 1908.

923,254.

Patented June 1, 1909.

WITNESSES:
D. Gurnee
C. W. Carroll

INVENTORS,
Frederick S. Ellett and
Clayton E. Forsyth
by Osgood Davis
their attorneys

UNITED STATES PATENT OFFICE.

FREDERICK S. ELLETT AND CLAYTON E. FORSYTH, OF ELMIRA, NEW YORK, ASSIGNORS TO ECLIPSE MACHINE COMPANY, OF ELMIRA, NEW YORK.

CLUTCH AND BRAKE MECHANISM.

No. 923,254.    Specification of Letters Patent.    Patented June 1, 1909.

Application filed June 27, 1908. Serial No. 440,629.

*To all whom it may concern:*

Be it known that we, FREDERICK S. ELLETT and CLAYTON E. FORSYTH, citizens of the United States, and residents of Elmira, in the county of Chemung and State of New York, have invented certain new and useful Improvements in Clutch and Brake Mechanisms, of which the following is a specification.

This invention relates to clutch and brake mechanism, with particular reference to back pedaling coaster brakes for velocipedes and like vehicles.

Figure 1:
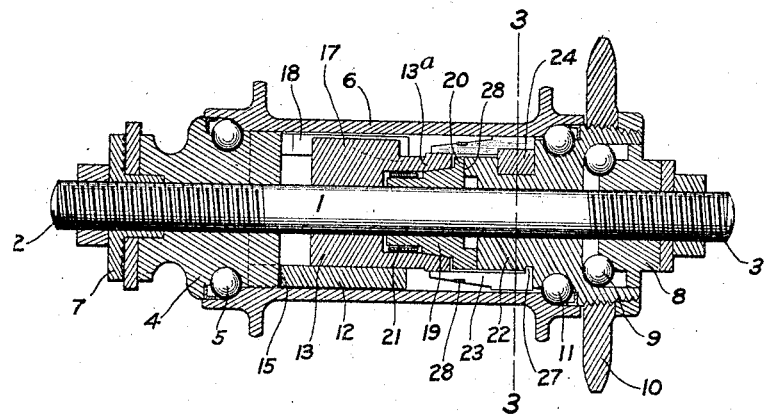
Figure 2:
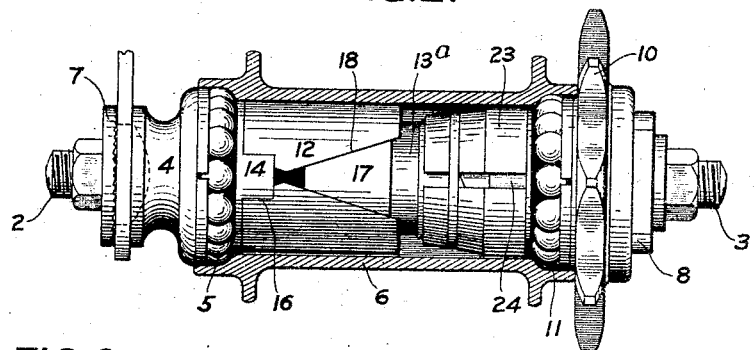
Figure 3:
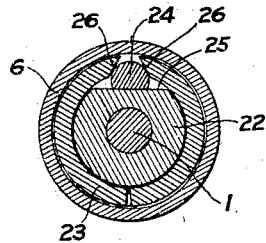
Figure 4:
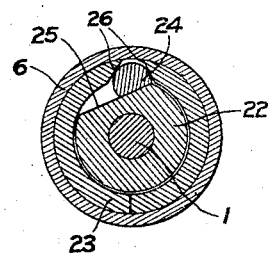
Figure 5:
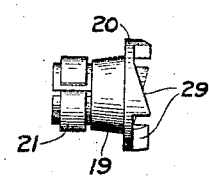

In the drawings:—Figure 1 is a central, longitudinal section of the rear hub of a bicycle equipped with the device; Fig. 2 is a side view with the hub cut away; Figs. 3 and 4 are both sections on the line 3–3 of Fig. 1, showing, respectively, the driving clutch in its operative and inoperative positions; and Fig. 5 shows two of the parts in side view.

1 is a stationary axle adapted to be locked within the rear forks of the bicycle, and is represented as threaded at both ends 2 and 3. A block 4 is screwed upon the end 2, which affords a ball race 5 for the hub 6, and is held stationary by the lug on the nut 7. On the other end of the axle a block 8 affords a ball race bearing 9 for the driving sprocket 10, which in turn affords a ball race bearing 11 for that end of the hub.

The brake ring or shell 12 is supported by a nonrotative, longitudinally movable sleeve 13. The sleeve is held against rotation by a connection with the stationary block 4 that permits it to move longitudinally. In the construction shown this is accomplished by a diametral shoulder 14 on the block 4 that enters a corresponding recess 15 in the end of this sleeve 13.

The brake ring 12 is also held against rotation, and in the construction shown this is effected by a diametral slot 16 that also receives the shoulder 14 on the block 4.

In the construction shown, the nonrotary, longitudinally movable sleeve 13, besides affording a support for the brake ring 12, is also the brake expander, for upon it is formed the inwardly directed wedge 17 that enters the slot 18 in the brake ring. It is formed in one piece with said sleeve. The sleeve 13 is extended inwardly beyond the wedge and toward the sprocket end of the hub, in the form of a ring 13ª, to meet and be engaged by the actuator 19. The latter is rotary upon the axle, and extends in between the axle and ring 13ª, besides having a flange 20 that engages said sleeve 13 to shift the expanding wedge.

The actuator 19 carries a retarder 21 that secures relative rotary movement between said actuator and the driver, and which consists of a flexible, split ring that is attached at one end to the actuator, and engages with its free end the sleeve 13. On forward driving this retarding ring tends to wind up, and so causes little friction, while on back pedaling it opens out and offers considerable resistance to the rotation of the actuator.

It should be observed that the parts so far described, which constitute the brake mechanism, can all be assembled together as a separate unit, and together placed within the hub, since with them it is possible to use a hub with a straight, uniform bore, as shown in the drawings.

The driving mechanism can be assembled as another unit before it is inserted within the hub, and it is an important feature of the device that the driving parts are adapted to lock together when assembled.

The driving mechanism that is adapted to be operated by the sprocket 10 comprises the sprocket extension 22 and a clutch carried by it for connecting the sprocket with the hub 6 for forward driving.

An expansible ring 23 is employed for the driving clutch that is expanded out against the hub by a block 24. The latter lies upon the surface 25 of the sprocket extension 22, below the opposing ends 25 of the ring 23, and enters between the said ends of the ring that are cut away to receive it.

The expansible ring shown consists of shoes that are held together by an elastic band 28. As shown in the drawings, the surface 25 extends transversely across the part 22, and the surface of the bar that engages the expansible ring is cylindrical in form, thus adapting the clutch for operation on reverse, as well as forward rotation of the sprocket, although the reverse operation is not made use of in its combination with a back pedaling brake. This is a clutch that releases and engages at once and cannot stick.

The clutch shoes 23 and block 24 are locked to the sprocket extension 22 by flanges 27 at the outer end of the shoes, that enter corresponding recesses in the sprocket extension in connection with the elastic band 28, that normally holds the shoes down upon the sprocket extension 22. Thus the clutch shoes form a cage for the bar 24. Again, the clutch shoes 23 are extended out beyond the inner end of the sprocket extension 22, so that when the driving mechanism is removed from the hub as one piece, and it is desired to remove either the clutch block 24, or the clutch shoes 23, it can be done readily by pinching the ends of the shoes that overhang the sprocket extension as aforesaid, till they tilt upon said sprocket extension and the flange 27 comes up out of its recess. When the driving elements are assembled with the braking elements, the shoes 23 overhang the end 13ª of the brake supporting sleeve 16.

The means upon the driving block 22 that shift the actuator inwardly upon the wedge-carrying sleeve 13 consist of cam faces 28, like ratchet teeth, that coöperate with corresponding cam faces 29 on the outer end of the actuator 19. On forward driving the ratchet teeth on these two parts mesh and the actuator recedes from the wedge-carrying sleeve and revolves with the driver, but on back pedaling the actuator is put into operation by shifting it inwardly against said sleeve.

What we claim is:—

1. The combination with a rotary driven hub, of a driving member, having an extension 22 that enters the hub, and has a recess that affords a bearing surface 25; an expansible, split clutch ring between said extension and said hub; and an expanding block within said recess adapted to be forced out upon said expansible clutch ring by said surface 25; substantially as shown and described.

2. The combination with a rotary driven hub, of a driving member, having an extension 22 that enters the hub, and has a recess that affords a bearing surface 25 that extends on both sides of a plane that is vertical to said surface and extends through the axis of rotation of the driver; an expansible, split, clutch ring between said extension and said hub; and a cylindrical, expanding block 24 within said recess; substantially as shown and described.

3. The combination with a rotary driven hub, of a driving member, having an extension 22 that enters the hub, and has a recess; an expanding block within the recess; and a removable cage for said block, consisting of the clutch shoes 23 that are held against longitudinal movement on said extension by engagement therewith, and are yieldingly clamped thereto; substantially as shown and described.

4. The combination with a rotary driven hub, of a driving member, having an extension 22 that enters the hub, and has a recess; an expanding block within the recess; and a removable cage for said block, consisting of the clutch shoes 23, that project in beyond said extension, are held against longitudinal movement thereon, by a projection on one part that enters a recess in the other, at a distance from the projecting ends of said shoes, and are yieldingly clamped to said extension; substantially as shown and described.

5. In a back pedaling coaster brake device, the combination with a rotary hub, of a driver; a brake anchor at one end of the hub held against rotation by attachment to the vehicle frame; an expansible split brake ring, nonrevolubly attached to said anchor; a sleeve within the brake ring to support the latter, said sleeve being nonrevolubly attached to said anchor, having a raised wedge formed on its surface, and adapted to move longitudinally with reference to said brake ring to expand it; and means operated by the driver on back pedaling whereby the sleeve is moved longitudinally and its wedge means made to expand said brake ring; substantially as shown and described.

FREDERICK S. ELLETT.
CLAYTON E. FORSYTH.

Witnesses:
D. L. WHITTIER,
L. S. WHITTIER.